United States Patent
Mei et al.

(10) Patent No.: US 9,704,503 B2
(45) Date of Patent: Jul. 11, 2017

(54) COMMAND HANDLING METHOD, APPARATUS, AND SYSTEM

(71) Applicant: Huawei Device Co., Ltd., Shenzhen (CN)

(72) Inventors: Jingqing Mei, Beijing (CN); Guodong Xue, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 188 days.

(21) Appl. No.: 14/520,575

(22) Filed: Oct. 22, 2014

(65) Prior Publication Data

US 2015/0039319 A1 Feb. 5, 2015

Related U.S. Application Data

(63) Continuation of application No. PCT/CN2013/081131, filed on Aug. 9, 2013.

(30) Foreign Application Priority Data

Aug. 9, 2012 (CN) .......................... 2012 1 0282268

(51) Int. Cl.
*G10L 21/00* (2013.01)
*G10L 15/18* (2013.01)
(Continued)

(52) U.S. Cl.
CPC .......... *G10L 21/00* (2013.01); *G10L 15/1822* (2013.01); *G10L 15/30* (2013.01); *G10L 2015/223* (2013.01)

(58) Field of Classification Search
CPC ......... G10L 15/18; G10L 15/19; G10L 17/00; G10L 2015/225; G10L 21/02;
(Continued)

(56) References Cited

U.S. PATENT DOCUMENTS 7,752,050 B1 * 7/2010 Hameed ................. G10L 15/26
600/118
7,899,669 B2 * 3/2011 Gadbois .................. G10L 15/32
379/88.01
(Continued)

FOREIGN PATENT DOCUMENTS

CN 101317416 A 12/2008
CN 101911723 A 12/2010
(Continued)

OTHER PUBLICATIONS

Foreign Communication From a Counterpart Application, European Application No. 13827606.8, Extended European Search Report dated May 6, 2015, 5 pages.
(Continued)

*Primary Examiner* — Abdelali Serrou
(74) *Attorney, Agent, or Firm* — Conley Rose, P.C.

(57) ABSTRACT

A command handling method, apparatus, and system. The method includes receiving multiple voice instructions sent by a voice parsing server, where the multiple voice instructions are generated after the voice parsing server parses source voice commands that are from different voice control devices; separately determining whether any two voice instructions in the multiple voice instructions are similar instructions, where the similar instructions are voice instructions corresponding to source voice commands that are obtained by the different voice control devices by collecting same voice information; and when two voice instructions that are similar instructions exist in the multiple voice instructions, discarding one voice instruction in the two similar voice instructions. The embodiments of the present invention further provide a command handling apparatus and system. The embodiments eliminate a control error caused by repeated execution of a command.

20 Claims, 8 Drawing Sheets

(51) Int. Cl.
*G10L 15/30* (2013.01)
*G10L 15/22* (2006.01)

(58) Field of Classification Search
CPC ......... G10L 21/06; G10L 21/10; G10L 15/02;
G10L 15/04; G10L 15/142; G10L 15/193;
G10L 15/28; G10L 17/02; G10L 19/00;
G10L 19/008; G10L 2015/227; G10L
2021/02087; G10L 21/0216; G10L
21/0272; G10L 21/0332; G10L 25/78;
G10L 13/00; G10L 13/043; G10L 15/06;
G10L 15/07; G10L 15/075; G10L 15/12;
G10L 15/16; G10L 15/197; G10L 19/012;
G10L 19/018; G10L 19/10; G10L
2015/0631; G10L 25/51; G10L 25/54;
G10L 2015/223; G10L 15/22; G10L
15/00; G10L 15/30; G10L 17/22; G10L
21/00; G10L 21/0208; G06F 3/167; G06F
17/2785; G06F 17/2705; G06F 17/30;
G06F 17/30528; G06F 17/30867; G06F
2203/0381; G06F 17/27
See application file for complete search history.

(56) References Cited

U.S. PATENT DOCUMENTS

| | | | |
|---|---|---|---|
| 8,340,975 B1 | 12/2012 | Rosenberger | |
| 8,423,893 B2* | 4/2013 | Ramsay | G06F 3/0486 715/716 |
| 8,725,492 B2* | 5/2014 | Odell | G10L 15/1815 704/251 |
| 9,152,634 B1* | 10/2015 | Bhattacharjee | G06F 17/30029 |
| 2001/0003173 A1 | 6/2001 | Lim | |
| 2004/0015566 A1* | 1/2004 | Anderson | G06F 17/30221 709/219 |
| 2005/0007976 A1* | 1/2005 | Koskinen | H04M 15/00 370/328 |
| 2005/0021616 A1* | 1/2005 | Rajahalme | H04L 12/1818 709/204 |
| 2006/0136220 A1* | 6/2006 | Gurram | G10L 15/005 704/275 |
| 2006/0222184 A1* | 10/2006 | Buck | G10L 21/0208 381/71.1 |
| 2007/0014278 A1 | 1/2007 | Ebbesen et al. | |
| 2007/0073540 A1* | 3/2007 | Hirakawa | G10L 15/22 704/252 |
| 2007/0128899 A1* | 6/2007 | Mayer | G06F 9/4406 439/152 |
| 2007/0253392 A1* | 11/2007 | Moreillon | H04N 7/162 370/338 |
| 2008/0177994 A1* | 7/2008 | Mayer | G06F 9/4418 713/2 |
| 2008/0242222 A1* | 10/2008 | Bryce | H04L 12/2809 455/3.06 |
| 2009/0055379 A1* | 2/2009 | Murtagh | H04M 7/003 |
| 2009/0190769 A1 | 7/2009 | Wang et al. | |
| 2009/0299751 A1* | 12/2009 | Jung | G10L 15/22 704/275 |
| 2010/0016006 A1* | 1/2010 | Inagaki | H04W 8/186 455/518 |
| 2010/0284389 A1* | 11/2010 | Ramsay | G06F 17/30017 370/338 |
| 2011/0301952 A1* | 12/2011 | Koshinaka | G10L 15/32 704/235 |
| 2012/0016678 A1 | 1/2012 | Gruber et al. | |
| 2012/0059845 A1* | 3/2012 | Covell | G06F 17/30743 707/769 |
| 2012/0233470 A1* | 9/2012 | Everett | G06Q 30/06 713/176 |
| 2012/0311090 A1* | 12/2012 | Locker | H04L 12/1822 709/218 |
| 2013/0018895 A1* | 1/2013 | Harless | G10L 15/1822 707/748 |
| 2013/0317827 A1* | 11/2013 | Fu | G10L 17/00 704/273 |

FOREIGN PATENT DOCUMENTS

| | | |
|---|---|---|
| CN | 102262879 A | 11/2011 |
| CN | 102831894 A | 12/2012 |
| EP | 1154406 A1 | 11/2001 |
| EP | 1215658 A2 | 6/2002 |
| JP | 2008003371 A | 1/2008 |

OTHER PUBLICATIONS

Partial English Translation and Abstract of Chinese Patent Application No. CN102262879A, Dec. 31, 2014, 6 pages.
Partial English Translation and Abstract of Chinese Patent Application No. CN102831894A, Part 1, Dec. 24, 2014, 12 pages.
Partial English Translation and Abstract of Chinese Patent Application No. CN102831894A, Part 2, Dec. 24, 2014, 3 pages.
Foreign Communication From a Counterpart Application, Chinese Application No. 201210282268.X, Chinese Office Action dated Jul. 18, 2013, 6 pages.
Foreign Communication From a Counterpart Application, PCT Application No. PCT/CN2013/081131, English Translation of International Search Report dated Nov. 7, 2013, 2 pages.
Foreign Communication From a Counterpart Application, PCT Application No. PCT/CN2013/081131, Written Opinion dated Nov. 7, 2013, 4 pages.

* cited by examiner

COMMAND HANDLING METHOD, APPARATUS, AND SYSTEM

CROSS-REFERENCE TO RELATED APPLICATIONS

This application is a continuation of International Application No. PCT/CN2013/081131, filed on Aug. 9, 2013, which claims priority to Chinese Patent Application No. 201210282268.X, filed on Aug. 9, 2012, both of which are hereby incorporated by reference in their entireties.

TECHNICAL FIELD

The present invention relates to communications technologies, and in particular, to a command handling method, apparatus, and system.

BACKGROUND

As a relatively simpler and more humanized control manner, a voice control technology has gradually been recognized by the industry. An increasing number of such electronic devices as smart phones, tablet computers, and smart televisions (TVs) have a voice control function and may appear in people's daily life at the same time. It can be predicted that the voice control function will be more diversified, and an increasing number of devices supporting voice control such as consumer electronics devices and office devices will emerge. With enhancement of a terminal device computing capability and an intelligent trend, functions that can be supported by some terminal devices become richer and may overlap. For example, a user may access Twitter® using a Smart Phone, a Smart TV, and the like. In addition, with popularity of home automation, other devices in a home area network may be controlled using each of smart terminals. For example, in a 4Home Service of Moto, a user may use a mobile phone to remotely control each of the household appliances. Therefore, the voice control technology may not only become an important man-to-machine interaction manner, but also be understood and executed by different smart terminals. An existing voice control technology mainly includes a traditional voice control technology and a smart voice control technology. In the traditional voice control technology, a user needs to issue a command according to a specific syntax and command vocabulary. In the smart voice control technology, a user can freely issue a command using a natural language. Compared with the traditional voice control technology with a relatively simple implementation mechanism, high accuracy, and relatively poor user experience, the smart voice control technology has a complex implementation mechanism and relatively good user experience. However, at present, it is generally believed in the industry that the smart voice control technology has a brighter development prospect, for example, companies such as Apple® and Google® are strengthening research and development in this aspect. Because computing overhead for the smart voice control technology is huge, a cloud processing mode is generally used, which may not only decrease complexity in local processing of a device, but also reduce energy consumption.

In the prior art, an execution manner of voice control is to keep running listened voice control on a background of an electronic device, for example, a Smart Interaction TV of Samsung® listens to an operation instruction of a user in real time, so as to quickly execute the operation instruction of the user.

However, a voice command sent by a user may be listened to by a plurality of devices at the same time. For example, when a user sends an instruction "decreasing a volume of a device B by one level" to a device A, the instruction may also be listened to by the device B. In this case, the device B executes an instruction delivered by the device A and the instruction directly received from the user. As a result, the volume of the device B is repeatedly reduced twice, which causes a voice command to be repeatedly executed and even causes a control error.

SUMMARY

Embodiments of the present invention provide a command handling method, apparatus, and system to avoid a fact that multiple voice control devices repeatedly execute a voice command collected at the same time, thereby eliminating a control error caused by repeated execution of a command.

According to a first aspect of an embodiment of the present invention, a command handling method is provided, including receiving multiple voice instructions sent by a voice parsing server, where the multiple voice instructions are generated after the voice parsing server parses source voice commands that are from different voice control devices; separately determining whether any two voice instructions in the multiple voice instructions are similar instructions, where the similar instructions are voice instructions corresponding to source voice commands that are obtained by the different voice control devices by collecting same voice information; and discarding, when two voice instructions that are similar instructions exist in the multiple voice instructions, one voice instruction in the two similar voice instructions.

In a first possible implementation manner of the first aspect, the multiple voice instructions separately carry collection time information of a source voice command corresponding to each voice instruction and instruction content of each voice instruction; and the separately determining whether any two voice instructions in the multiple voice instructions are similar instructions includes separately determining, according to collection time information of source voice commands corresponding to the multiple voice instructions, whether collection time of source voice commands corresponding to the any two voice instructions in the multiple voice instructions overlaps; separately determining, according to instruction content of the multiple voice instructions, whether content of the any two voice instructions in the multiple voice instructions is repeated; and determining that the two voice instructions are similar instructions when the collection time of the source voice commands corresponding to the any two voice instructions in the multiple voice instructions overlaps, and the content of the any two voice instructions in the multiple voice instructions is repeated.

With reference to the first possible implementation manner of the first aspect, in a second possible implementation manner of the first aspect, the method further includes recording, when a new voice instruction is received from the voice parsing server, collection time information of the new voice instruction; comparing collection time of the new voice instruction with collection time of a previously recorded voice instruction, and determining a related voice instruction of which a difference between the collection time and the collection time of the new voice instruction is smaller than a predetermined threshold; and using the new voice instruction and the related voice instruction as the multiple voice instructions.

With reference to the first possible implementation manner of the first aspect or the second possible implementation manner of the first aspect, in a third possible implementation manner of the first aspect, the separately determining, according to collection time information of source voice commands corresponding to the multiple voice instructions, whether collection time of source voice commands corresponding to the any two voice instructions in the multiple voice instructions overlaps, includes separately determining, according to initial time stamps and end time stamps of the source voice commands corresponding to the multiple voice instructions, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and if the difference of the initial time stamps and the difference of the end time stamps are both smaller than the preset threshold, determining that the collection time of the source voice commands corresponding to the any two voice instructions in the multiple voice instructions overlaps; or separately acquiring duration of the multiple voice instructions according to initial time stamps and end time stamps of the source voice commands corresponding to the multiple voice instructions; determining whether duration of the any two voice instructions in the multiple voice instructions overlaps; and if the duration overlaps, determining that the collection time of the source voice commands corresponding to the any two voice instructions in the multiple voice instructions overlaps.

With reference to the first aspect, the first possible implementation manner of the first aspect, the second possible implementation manner of the first aspect, or the third possible implementation manner of the first aspect, in a fourth possible implementation manner of the first aspect, the multiple voice instructions further separately carry a priority parameter of the source voice command corresponding to each voice instruction; and the method further includes determining a voice instruction with a higher priority in two similar voice instructions and a voice instruction with a lower priority in the two similar voice instructions according to the priority parameter of the source voice command corresponding to the voice instruction; and the discarding, when two voice instructions that are similar instructions exist in the multiple voice instructions, one voice instruction in the two similar voice instructions, includes, when the two voice instructions that are the similar instructions exist in the multiple voice instructions, returning the voice instruction with the higher priority in the two similar voice instructions to a corresponding voice control device, and discarding the voice instruction with the lower priority.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the command handling method according to the embodiment of the present invention further includes, when a received new voice instruction and a voice instruction that has been returned to other voice control devices are similar instructions, discarding the new voice instruction.

With reference to the first aspect, in a sixth possible implementation manner of the first aspect, the command handling method according to the embodiment of the present invention further includes performing, by the voice parsing server, time synchronization with the voice control devices; and separately receiving, by the voice parsing server, the source voice commands sent by the voice control devices.

With reference to the first aspect, in a seventh possible implementation manner of the first aspect, the command handling method according to the embodiment of the present invention further includes performing, by a local voice control gateway, time synchronization with the voice control devices; and separately receiving, by the local voice control gateway, the source voice commands sent by the voice control devices and sending the source voice commands to the voice parsing server.

According to a second aspect of an embodiment of the present invention, a command handling apparatus is provided, including: a receiving module configured to receive multiple voice instructions sent by a voice parsing server, where the multiple voice instructions are generated after the voice parsing server parses source voice commands that are from different voice control devices; a judging module configured to separately determine whether any two voice instructions in the multiple voice instructions received by the receiving module are similar instructions, where the similar instructions are voice instructions corresponding to source voice commands that are obtained by the different voice control devices by collecting same voice information; and a redundant command handling module configured to discard, when a determining result of the judging module is that two voice instructions that are similar instructions exist in the multiple voice instructions, one voice instruction in the two similar voice instructions.

In a first possible implementation manner of the second aspect, the multiple voice instructions received by the receiving module separately carry collection time information of a source voice command corresponding to each voice instruction and instruction content of each voice instruction; and the judging module includes a first judging unit configured to separately determine, according to collection time information of source voice commands corresponding to the multiple voice instructions received by the receiving module, whether collection time of source voice commands corresponding to the any two voice instructions in the multiple voice instructions overlaps; a second judging unit configured to separately determine, according to instruction content of the multiple voice instructions received by the receiving module, whether content of the any two voice instructions in the multiple voice instructions is repeated; and a similar instruction determining unit configured to determine, when determining results of the first judging unit and the second judging unit are that the collection time of the source voice commands corresponding to the any two voice instructions in the multiple voice instructions overlaps, and that the content of the any two voice instructions in the multiple voice instructions is repeated, that the two voice instructions are similar instructions.

With reference to the first possible implementation manner of the second aspect, in a second possible implementation manner of the second aspect, the apparatus further includes a recording module configured to record, when a new voice instruction is received from the voice parsing server, collection time information of the new voice instruction; and a voice instruction determining module configured to compare collection time of the new voice instruction with collection time of a voice instruction previously recorded by the recording module, determine a related voice instruction of which a difference between the collection time and the collection time of the new voice instruction is smaller than a predetermined threshold, and use the new voice instruction and the related voice instruction as the multiple voice instructions.

With reference to the first possible implementation manner of the second aspect or the second possible implementation manner of the second aspect, in a third possible implementation manner of the second aspect, the first judging unit includes a first judging subunit configured to separately determine, according to initial time stamps and end time stamps of the source voice commands corresponding to the multiple voice instructions received by the receiving module, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and if the difference of the initial time stamps and the difference of the end time stamps are both smaller than the preset threshold, determine that the collection time of the source voice commands corresponding to the any two voice instructions in the multiple voice instructions overlaps; or a second judging subunit configured to separately acquire duration of the multiple voice instructions according to initial time stamps and end time stamps of the source voice commands corresponding to the multiple voice instructions received by the receiving module, determine whether duration of the any two voice instructions in the multiple voice instructions overlaps, and if the duration overlaps, determine that the collection time of the source voice commands corresponding to the any two voice instructions in the multiple voice instructions overlaps.

With reference to the second aspect, the first possible implementation manner of the second aspect, the second possible implementation manner of the second aspect, or the third possible implementation manner of the second aspect, in a fourth possible implementation manner of the second aspect, the multiple voice instructions received by the receiving module further carry priority parameters of the source voice commands corresponding to the multiple voice instructions; the apparatus further includes an acquiring module configured to determine a voice instruction with a higher priority in two similar voice instructions and a voice instruction with a lower priority in the two similar voice instructions according to the priority parameters of the source voice commands corresponding to the voice instructions received by the receiving module; and the redundant command handling module is configured to, when the determining result of the judging module is that two voice instructions that are similar instructions exist in the multiple voice instructions, return the voice instruction with the higher priority in the two similar voice instructions to a corresponding voice control device, and discard the voice instruction with the lower priority.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the redundant command handling module is further configured to discard, when a new voice instruction received by the receiving module and a voice instruction that has been returned to other voice control devices are similar instructions, the new voice instruction.

According to a third aspect of an embodiment of the present invention, a command handling system is provided, including a voice parsing server, multiple voice control devices, and the foregoing command handling apparatus, where the multiple voice control devices are configured to separately collect multiple source voice commands, and separately send the multiple source voice commands to the voice parsing server; and the voice parsing server is configured to receive the multiple source voice commands sent by the multiple voice control devices, generate multiple voice instructions corresponding to the multiple source voice commands after parsing the multiple source voice commands, and separately send the multiple voice instructions to the command handling apparatus.

In a first possible implementation manner of the third aspect, the voice parsing server is further configured to perform time synchronization with the multiple voice control devices.

According to a fourth aspect of an embodiment of the present invention, a command handling system is provided, including a voice parsing server, multiple voice control devices, and a local voice control gateway, where the local voice control gateway includes the foregoing command handling apparatus; the multiple voice control devices are configured to separately collect multiple source voice commands, and separately send the multiple source voice commands to the local voice control gateway; and the voice parsing server is configured to separately receive the multiple source voice commands sent by the local voice control gateway, generate multiple voice instructions corresponding to the multiple source voice commands after parsing the multiple source voice commands, and separately return the multiple voice instructions to the local voice control gateway.

In a first possible implementation manner of the fourth aspect, the local voice control gateway is further configured to perform time synchronization with the multiple voice control devices.

A technical effect of the embodiments of the present invention is by receiving multiple voice instructions sent by a voice parsing server, it is separately determined whether any two voice instructions in the multiple voice instructions are similar instructions, where the similar instructions are voice instructions corresponding to source voice commands that are obtained by different voice control devices by collecting same voice information; when two voice instructions are similar instructions, one voice instruction in the two similar voice instructions is discarded. In the embodiments, a fact that multiple voice control devices repeatedly execute a voice command collected at the same time is avoided, thereby eliminating a control error caused by repeated execution of a command.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
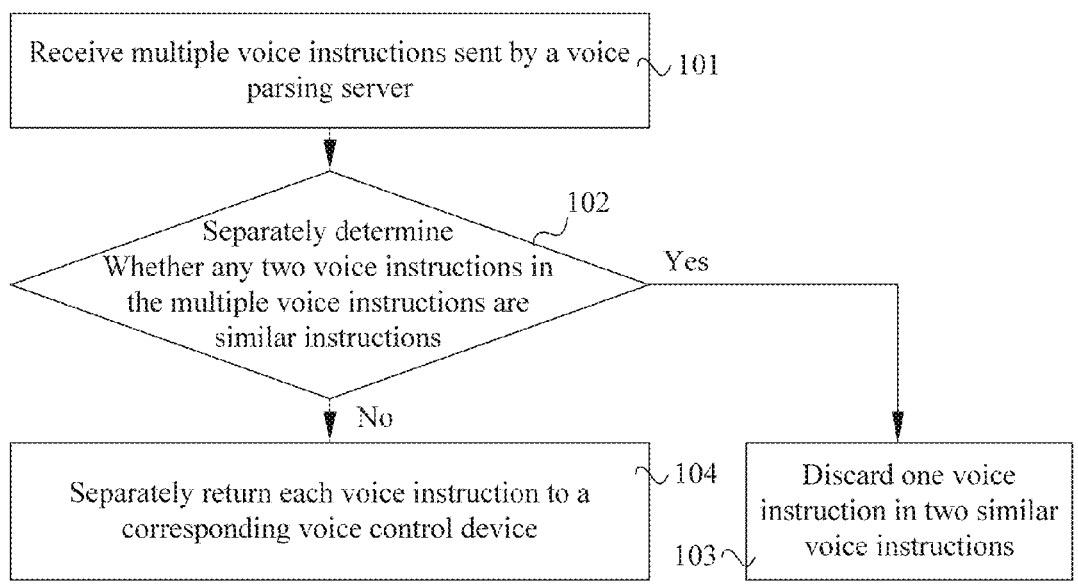
FIG. 1 is a flowchart of a command handling method according to Embodiment 1 of the present invention.

FIG. 1 is a flowchart of a command handling method according to Embodiment 1 of the present invention. As shown in FIG. 1, this embodiment provides a command handling method which may include the following steps:

Step 101: Receive multiple voice instructions sent by a voice parsing server.

This embodiment puts forward a redundant voice command identification and handling (RECH) mechanism. Further, a RECH functional entity may be added in an existing voice control system. The RECH functional entity may be an independent device, or may be a module integrated into an existing device. Further, the RECH functional entity in this embodiment may be disposed along with a voice parsing server on a network side, or may be directly disposed in a voice parsing server as a module. The RECH functional entity may also be disposed locally, that is, disposed along with a local voice control gateway, or may be directly disposed in a voice control gateway as a module.

In this step, the RECH functional entity receives the multiple voice instructions sent by the voice parsing server. The multiple voice instructions may be successively sent by the voice parsing server, and the multiple voice instructions may be generated and sent by the voice parsing server within a preset period of time. Setting the preset period of time herein aims to perform different processing on voice instructions received at different moments. When a time difference between two received voice instructions is relatively large, a voice instruction received earlier may be directly returned to a corresponding voice control device, instead of waiting until a later voice instruction is received and processing after performing similarity determining on the two voice instructions. Therefore, in this embodiment, a preset period of time may be set, and similarity determining is performed on any two of voice instructions received within the preset period of time. The multiple voice instructions are generated after the voice parsing server parses source voice commands that are from different voice control devices. In this embodiment, two voice instructions on which similarity determining requires to be performed are voice instructions that are from different voice control devices. However, similarity determining does not require to be performed on voice instructions from a same voice control device. The voice instructions are generated after the voice parsing server parses the source voice commands that are from the different voice control devices. The voice parsing server parses each source voice command and generates a voice instruction corresponding to each source voice command.

Step 102: Separately determine whether any two voice instructions in the multiple voice instructions are similar instructions; if any two voice instructions in the multiple voice instructions are similar instructions, step 103 is executed; and if any two voice instructions in the multiple voice instructions are not similar instructions, step 104 is executed.

After the voice instructions are received, it is determined whether the any two voice instructions in the multiple voice instructions are similar instructions. The similar instructions herein are voice instructions corresponding to source voice commands that are obtained by the different voice control devices by collecting same voice information. Further, in this embodiment, when similarity determining may be performed on the any two voice instructions in each voice instruction, it is determined whether every two instructions are the voice instructions corresponding to the source voice commands that are obtained by the different voice control devices by collecting the same voice information; if yes, that is, two voice instructions in the voice instructions are similar instructions, step 103 is executed; and if no, that is, any two voice instructions in the voice instructions are not similar instructions, step 104 is executed. Further, when similarity determining is performed, it may be determined, according to collection time information of corresponding source voice commands, whether collection time of the two voice instructions overlaps, and it may also be determined, according to instruction content of the voice instructions, whether the content of the two voice instructions is repeated.

Further, in this embodiment, the multiple voice instructions received in the foregoing step 101 are voice instructions that meet a preset time condition. The preset time condition herein is used to limit collection time of source voice commands corresponding to voice instructions on which similarity determining is performed. For example, similarity determining requires to be performed only on voice instructions with a short collection time interval, and it is basically impossible that voice instructions with a long collection time interval (for example, more than two minutes) are similar instructions. After the foregoing step 101, this embodiment may further include the following steps: recording, when a new voice instruction is received from the voice parsing server, collection time information of the new voice instruction; comparing collection time of the new voice instruction with collection time of a previously recorded voice instruction, determining a related voice instruction of which a difference between the collection time and the collection time of the new voice instruction is smaller than a predetermined threshold; and using the new voice instruction and the related voice instruction as the multiple voice instructions, where collection time of a voice instruction is an initial time stamp of a source voice command corresponding to the voice instruction.

Correspondingly, in this embodiment, an instruction time table may be configured, and collection time of a received voice instruction is recorded to the instruction time table. In this embodiment, a timer may also be configured for the instruction time table. The timer is configured to perform timing on collection time information stored in the instruction time table. When time corresponding to collection time information in the instruction time table is larger than a preset time; for example, the preset time is 5 minutes, it indicates that a voice instruction corresponding to the collection time information has expired, and it is basically impossible that the voice instruction and other subsequently received voice instructions are similar instructions. In this case, time information of the instruction may be deleted from the instruction time table, and the corresponding voice instruction that has expired is not subsequently acquired from the instruction time table.

In this embodiment, to avoid a large calculation volume caused by similarity determining of all voice instructions, collection time of voice instructions on which similarity determining requires to be performed is limited, that is, collection time that is of each voice instruction and is stored in the instruction time table is used to determine whether similarity determining requires to be performed on two voice instructions. Herein, the related voice instruction of which the difference between the collection time and the collection time of the new voice instruction is smaller than the predetermined threshold is acquired according to the instruction time table. The related voice instruction acquired herein and the new voice instruction are the multiple voice instructions on which similarity determining requires to be performed currently.

Step 103: Discard one voice instruction that is in the two similar voice instructions.

After the foregoing similarity determining, when two voice instructions that are similar instructions exist in the multiple voice instructions, one voice instruction may be selected to discard from the two similar voice instructions, thereby avoiding occurrence of a redundant instruction, and effectively avoiding repeated execution of a same command. In addition, the other voice instruction is sent to a voice control device corresponding to the voice instruction. After receiving a respective voice instruction of each voice control device, the voice control device may execute an operation indicated by the voice instruction to respond to a source voice command sent by a user.

In this embodiment, redundancy processing may also be performed on the two voice instructions according to priorities of the source voice commands corresponding to the two similar voice instructions. A priority of a voice instruction may be acquired according to a priority that is of a source voice command and is set by default, or a priority parameter of the source voice command may be carried in a voice instruction. The priority parameter may be set according to an actual situation, for example, a volume value for receiving a source voice command by a voice control device is configured as the priority parameter. A higher volume value indicates a higher priority of a corresponding voice instruction. Further, a voice instruction with a higher priority in the two similar voice instructions is returned to a corresponding voice control device. The corresponding voice control device herein is a device that sends a source voice command corresponding to the voice instruction to the voice parsing server. After receiving a voice instruction of each voice control, the voice control device may execute an operation indicated by the voice instruction to respond to a source voice command sent by a user. In addition, a voice instruction with a lower priority in the two similar voice instructions is discarded; and a redundant instruction indication may be sent to a voice control device corresponding to the voice instruction with the lower priority, so as to notify that the source voice command listened to by the voice control device is a redundant command, thereby effectively avoiding repeated execution of a same command.

Step 104: Separately return each voice instruction to a corresponding voice control device.

After the foregoing similarity determining, when no similar instructions exist in the multiple voice instructions, each voice instruction may be directly and separately returned to the corresponding voice control device. The corresponding voice control device herein is the device that sends the source voice command corresponding to the voice instruction to the voice parsing server. Each voice instruction corresponds to a voice control device. After receiving a respective voice instruction, the voice control device may execute the operation indicated by the voice instruction to respond to the source voice command sent by the user.

This embodiment provides a command handling method. By receiving multiple voice instructions sent by a voice parsing server it is separately determined whether any two voice instructions in the multiple voice instructions are similar instructions, where the similar instructions are voice instructions corresponding to source voice commands that are obtained by different voice control devices by collecting same voice information; when two voice instructions are similar instructions, one voice instruction in the two similar voice instructions is discarded. In this embodiment, a fact that multiple voice control devices repeatedly execute a voice command collected at the same time is avoided, thereby eliminating a control error caused by repeated execution of a command.

Figure 2:
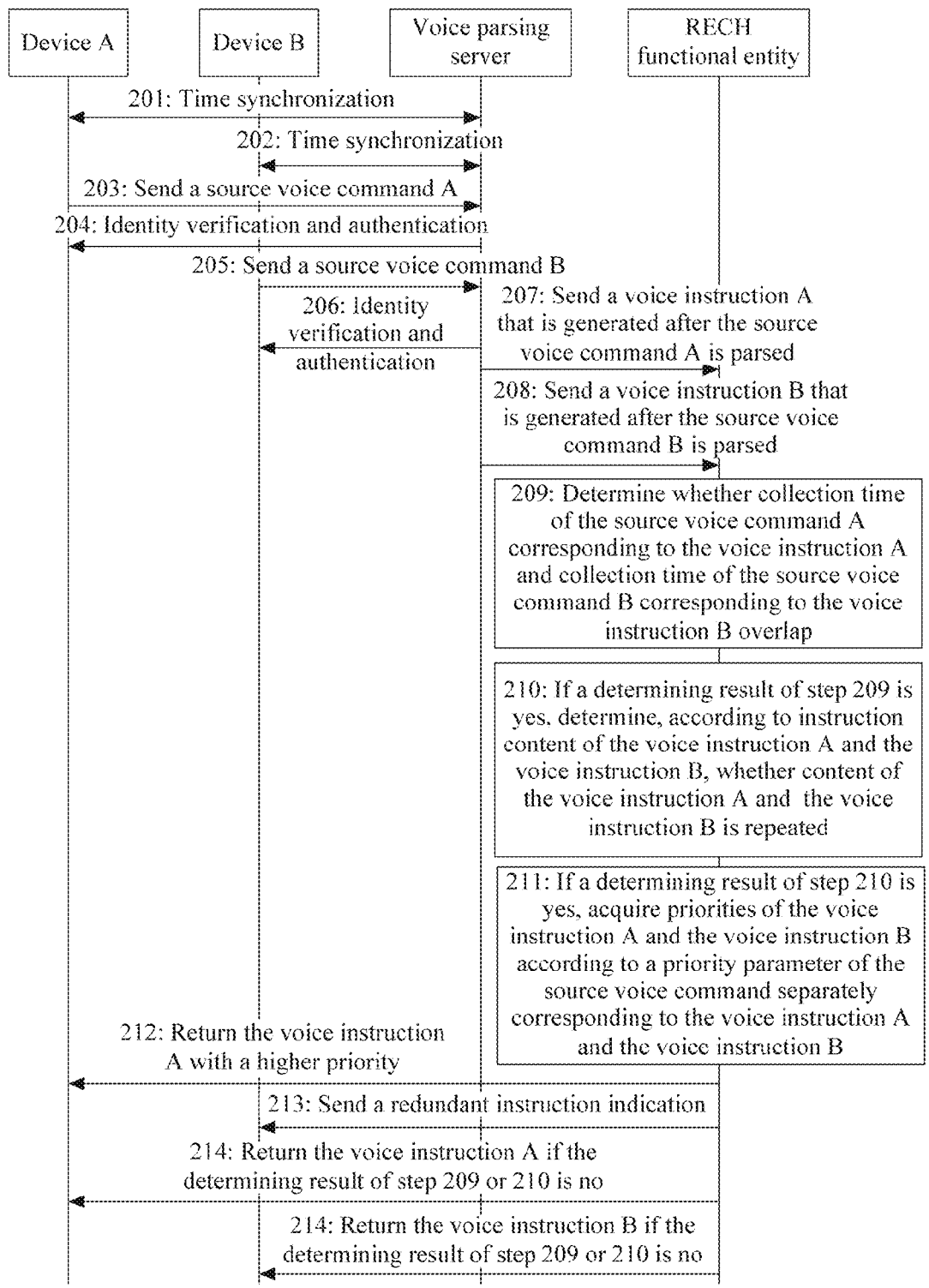
FIG. 2 is a flowchart of a command handling method according to Embodiment 2 of the present invention.
Figure 3:
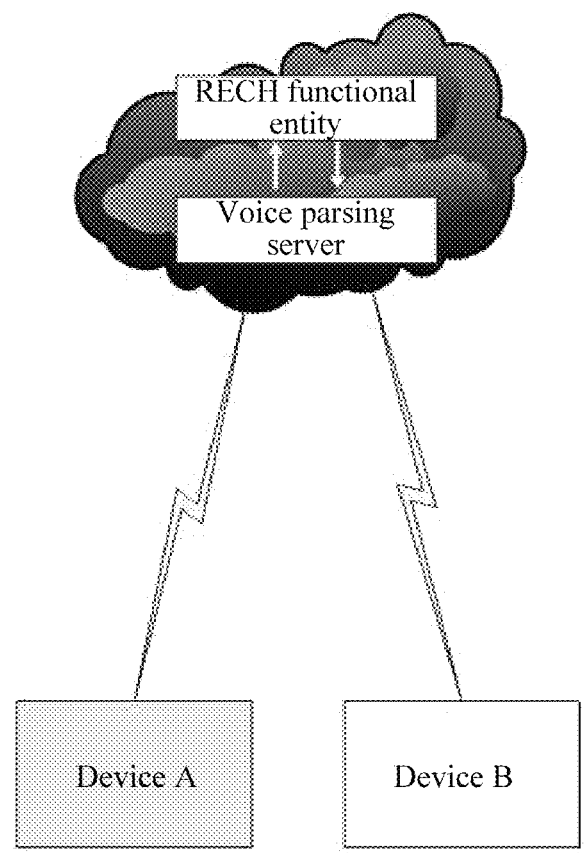
FIG. 3 is a schematic diagram of a system architecture of a command handling method according to Embodiment 2 of the present invention.

FIG. 2 is a signaling diagram of a command handling method according to Embodiment 2 of the present invention. As shown in FIG. 2, this embodiment provides a command handling method. In this embodiment, a RECH functional entity is disposed on a network side. FIG. 3 is a schematic diagram of a system architecture of a command handling method according to Embodiment 2 of the present invention. As shown in FIG. 3, it is assumed that a device A and a device B are two voice control devices, and both have a voice control function. That the two voice control devices exist in a network is used as an example in this embodiment to describe the solutions of the present invention. The RECH functional entity is a device independent of a voice parsing server. Certainly, the RECH functional entity may also be integrated into a voice parsing server. Further, the command handling method provided by this embodiment may include the following steps:

Step 201: A device A performs time synchronization with a voice parsing server.

Step 202: A device B performs time synchronization with the voice parsing server.

In the foregoing steps, both the device A and the device B that have a voice control function first separately perform time synchronization with the voice parsing server that is on the network side, so that a subsequent voice parsing server can accurately acquire collection time information carried in a source voice command.

It should be noted that no time sequence limitation relationship exists between the foregoing step 201 and step 202 in this embodiment, that is, the two steps may be executed at the same time or may be executed in any order.

Step 203: The device A sends a source voice command A to the voice parsing server.

After the device A listens to and collects a source voice command sent by a user, where the source voice command may be "decreasing a volume of the device B by one level", before executing the source voice command, the device A needs to send the source voice command to the voice parsing server for parsing. In this step, the device A sends the source voice command A to the voice parsing server. The source voice command A herein refers to a source voice command reported by the device A. An initial time stamp (initial time stamp A), an end time stamp (end time stamp A), and a priority parameter (a priority re-value A) of the source voice command A are carried in the source voice command A. The initial time stamp of the source voice command A is used to indicate initial time of the source voice command listened to by the device A. The end time stamp of the source voice command A is used to indicate end time of the source voice command listened to by the device A. The priority parameter is a parameter that is set by a user or a device and is used to identify a priority of a device or a command when similar instructions occur.

Step 204: The voice parsing server performs identity verification and authentication on the device A.

After receiving the source voice command reported by the device A, the voice parsing server first performs identity verification and authentication on the device A, and then executes subsequent parsing after identity verification and authentication are successful.

Step 205: The device B sends a source voice command B to the voice parsing server.

After the device B listens to and collects a source voice command sent by a user, where the source voice command may be "decreasing a volume of the device B by one level", before executing the source voice command, the device B needs to send the source voice command to the voice parsing server for parsing. In this step, the device B sends the source voice command B to the voice parsing server. The source voice command B herein refers to a source voice command reported by the device B. An initial time stamp (initial time stamp B), an end time stamp (end time stamp B), and a priority parameter (priority re-value B) of the source voice command B are carried in the source voice command B. The initial time stamp of the source voice command B is used to indicate initial time of the source voice command listened to by the device B. The end time stamp of the source voice command B is used to indicate end time of the source voice command listened to by the device B. The priority parameter is a parameter that is set by a user and is used to identify a priority of a device or a command when similar instructions occur.

Step 206: The voice parsing server performs identity verification and authentication on the device B.

After receiving the source voice command reported by the device B, the voice parsing server first performs identity verification and authentication on the device B, and then executes subsequent parsing after identity verification and authentication are successful.

It should be noted that no time sequence limitation relationship exists between the foregoing step 204 and step 206 in this embodiment, that is, the two steps may be executed at the same time or may be executed in any order.

Step 207: The voice parsing server sends a voice instruction A that is generated after the source voice command A is parsed to a RECH functional entity.

After the voice parsing server receives the source voice command A reported by the device A and completes identity verification and authentication on the device A, the voice parsing server parses the source voice command A and generates, by means of parsing, the voice instruction A that can be understood and executed by a device. The voice instruction A corresponds to the source voice command A. The voice parsing server sends the voice instruction A generated after parsing to the RECH functional entity. The initial time stamp, the end time stamp, and the priority parameter of the source voice command A corresponding to the voice instruction A are carried in the voice instruction A. The RECH functional entity performs similarity determining on the voice instruction A and another voice instruction.

Step 208: The voice parsing server sends a voice instruction B that is generated after the source voice command B is parsed to the RECH functional entity.

After the voice parsing server receives the source voice command B reported by the device B and completes identity verification and authentication on the device B, the voice parsing server parses the source voice command B and generates, by means of parsing, the voice instruction B that can be understood and executed by a device. The voice instruction B corresponds to the source voice command B. The voice parsing server sends the voice instruction B generated after parsing to the RECH functional entity. The initial time stamp, the end time stamp, and the priority parameter of the source voice command B corresponding to the voice instruction B are carried in the voice instruction B. The RECH functional entity performs similarity determining on the voice instruction B and another voice instruction.

It should be noted that no time sequence limitation relationship exists between the foregoing step 207 and step 208 in this embodiment, that is, the two steps may be executed at the same time or may be executed in any order.

Step 209: The RECH functional entity determines, according to an initial time stamp and an end time stamp of the source voice command separately corresponding to the voice instruction A and the voice instruction B, whether collection time of the source voice command A corresponding to the voice instruction A and collection time of the source voice command B corresponding to the voice instruction B overlap; if yes, step 210 is executed; and if no, step 214 is executed.

After receiving the voice instruction A and the voice instruction B from the voice parsing server, the RECH functional entity determines, according to collection time information carried in the voice instruction A and the voice instruction B, whether the collection time of the source voice command A corresponding to the voice instruction A and the collection time of the source voice command B corresponding to the voice instruction B overlap, that is, performs time similarity determining, where the collection time information may include an initial time stamp and an end time stamp. During the time similarity determining, the RECH functional entity may determine whether a difference between the initial time stamp of the source voice command A and the initial time stamp of the source voice command B is smaller than a preset threshold, and determine whether a difference between the end time stamp of the source voice command A and the end time stamp of the source voice command B is smaller than a preset threshold. If both of the difference of the initial time stamps between the two and the difference of the end time stamps between the two are smaller than the preset threshold, it indicates that the collection time of the source voice command A corresponding to the voice instruction A and the collection time of the source voice command B corresponding to the voice instruction B overlap; and in this case, step 210 is executed. If the difference of the initial time stamps or end time stamps between the two is greater than or equal to the preset threshold, it indicates that the collection time of the source voice command A corresponding to the voice instruction A and the collection time of the source voice command B corresponding to the voice instruction B do not overlap; and in this case, step 214 is executed.

Alternatively, during time similarity determining, the RECH functional entity may also separately acquire duration of the voice instruction A and the voice instruction B according to the initial time stamp and the end time stamp of the source voice command separately corresponding to the voice instruction A and the voice instruction B, and determine whether the duration of the voice instruction A and the duration of the voice instruction B overlap. If the duration of the voice instruction A and the voice instruction B overlaps, it indicates that the collection time of the source voice command A corresponding to the voice instruction A and the collection time of the source voice command B corresponding to the voice instruction B overlap; and in this case, step 210 is executed. If the duration of the voice instruction A and the voice instruction B does not overlap, it indicates that the collection time of the source voice command A corresponding to the voice instruction A and the collection time of the source voice command B corresponding to the voice instruction B do not overlap; and in this case, step 214 is executed.

Further, in this embodiment, before the foregoing step 209, the RECH functional entity may also first determine whether a difference between an initial time stamp of the voice instruction A and an initial time stamp of the voice instruction B is greater than a preset time threshold; if yes, step 209 is executed; and if no, the procedure is ended.

Step 210: The RECH functional entity determines, according to instruction content of the voice instruction A and the voice instruction B, whether content of the voice instruction A and the voice instruction B is repeated; if yes, step 211 is executed; and if no, step 214 is executed.

In the foregoing step of determining, when the RECH functional entity determines that the collection time of the source voice command A corresponding to the voice instruction A and the collection time of the source voice command B corresponding to the voice instruction B overlaps, the RECH functional entity further determines, according to instruction content of the voice instruction A and the voice instruction B, whether the content of the voice instruction A and the voice instruction B is repeated. Further, voice features of users may be compared to determine whether the source voice commands corresponding to the two voice instructions are sent by a same user. If the instruction content of the voice instruction A and the voice instruction B overlaps to a great extent; for example, a threshold may be set, and if a percentage of overlapping content to the instruction content of the voice instruction A and the voice instruction B is greater than the threshold, it indicates that the content of the voice instruction A and the voice instruction B is repeated; and in this case, the voice instruction A and the voice instruction B are similar instructions, and step 211 is executed. If the instruction content of the voice instruction A and the voice instruction B is different, it indicates that the content of the voice instruction A and the voice instruction B is not repeated; and in this case, the voice instruction A and the voice instruction B are not similar instructions, and step 214 is executed.

It should be noted that it may also be first determined whether the content of the voice instruction A and the voice instruction B is repeated. When the content of the voice instruction A and the voice instruction B is not repeated, step 214 is executed. When the content of the voice instruction A and the voice instruction B is repeated, it is then determined whether the collection time of the source voice command corresponding to the voice instruction A and the collection time of the source voice command corresponding to the voice instruction B overlap. When the collection time does not overlap, step 214 is executed, and when the collection time overlaps, step 211 is executed.

Step 211: The RECH functional entity acquires priorities of the voice instruction A and the voice instruction B according to a priority parameter of the source voice command separately corresponding to the voice instruction A and the voice instruction B.

In a process of the foregoing time similarity determining and content similarity determining, when it is determined that the voice instruction A and the voice instruction B are similar instructions, the RECH functional entity separately acquires the priorities of the voice instruction A and the voice instruction B according to the priority parameter of the source voice command separately corresponding to the voice instruction A and the voice instruction B. For example, when the priority parameter is set to a volume value for receiving a source voice command by a device, a volume value for receiving the source voice command A by the device A is compared with a volume value for receiving the source voice command B by the device B. A device with a greater volume value indicates that the device is closer to a user, and the device may be a device that a user faces. Herein, the device with the greater volume value may be used as a device with a higher priority, that is, the device is defined as a main source voice command collecting terminal. A device with a smaller volume value is used as a device with a lower priority. Correspondingly, a priority of a voice instruction corresponding to a device with a higher priority is also higher, and a priority of a voice instruction corresponding to a device with a lower priority is also lower. In this embodiment, it is assumed that the priority of the voice instruction A is higher than the priority of the voice instruction B.

Step 212: The RECH functional entity returns the voice instruction A with a higher priority to the device A and discards the voice instruction B with a lower priority.

In this embodiment, the voice instruction A with the higher priority is considered as being sent by a source voice command collecting terminal, and the voice instruction B with the lower priority is considered as a redundant instruction. After the priorities of the voice instruction A and the voice instruction B are acquired, the RECH functional entity directly returns the voice instruction A with the higher priority to the device A and discards the voice instruction B with the lower priority.

Step 213: The RECH functional entity sends a redundant instruction indication to the device B.

In this embodiment, the RECH functional entity may further send the redundant instruction indication to the device B to notify the device B that the source voice command listened to by the device B is a redundant command that is unnecessary to be executed.

Step 214: The RECH functional entity returns the voice instruction A to the device A and returns the voice instruction B to the device B.

By means of the foregoing determining, if the voice instruction A and the voice instruction B do not meet a time similarity condition or a content similarity condition, it indicates that the voice instruction A and the voice instruction B are not similar instructions. In this case, the RECH functional entity directly returns the voice instruction A to the device A and returns the voice instruction B to the device B. The device A and the device B respectively execute the voice instruction A and the voice instruction B.

In this embodiment, after each of the foregoing steps are executed, if the RECH functional entity receives a new voice instruction from the voice parsing server, the RECH functional entity may further perform similarity determining on the new voice instruction and a voice instruction that has been returned to other voice control devices. For example, after the RECH functional entity returns the voice instruction A to the device A, if the RECH functional entity further receives, from the voice parsing server, a new voice instruction from the device B, the RECH functional entity may further perform similarity determining on the new voice instruction and the voice instruction A that has been returned to the device A. When the new voice instruction and the voice instruction A are similar instructions, the new instruction does not require to be returned to the device B but is directly discarded.

This embodiment provides a command handling method. An RECH functional entity receives a voice instruction A and a voice instruction B sent by a voice parsing server; determines whether the voice instruction A and the voice instruction B are similar instructions according to an initial time stamp and an end time stamp of a source voice command separately corresponding to the voice instruction A and the voice instruction B, and according to instruction content of the voice instruction A and the voice instruction B; and when the voice instruction A and the voice instruction B are the similar instructions, returns a voice instruction with a higher priority to a corresponding voice control device and discards a voice instruction with a lower priority according to a priority parameter of the source voice command separately corresponding to the voice instruction A and the voice instruction B. In this embodiment, a fact that multiple voice control devices repeatedly execute a voice command collected at the same time is avoided, thereby eliminating a control error caused by repeated execution of a command.

Figure 4:
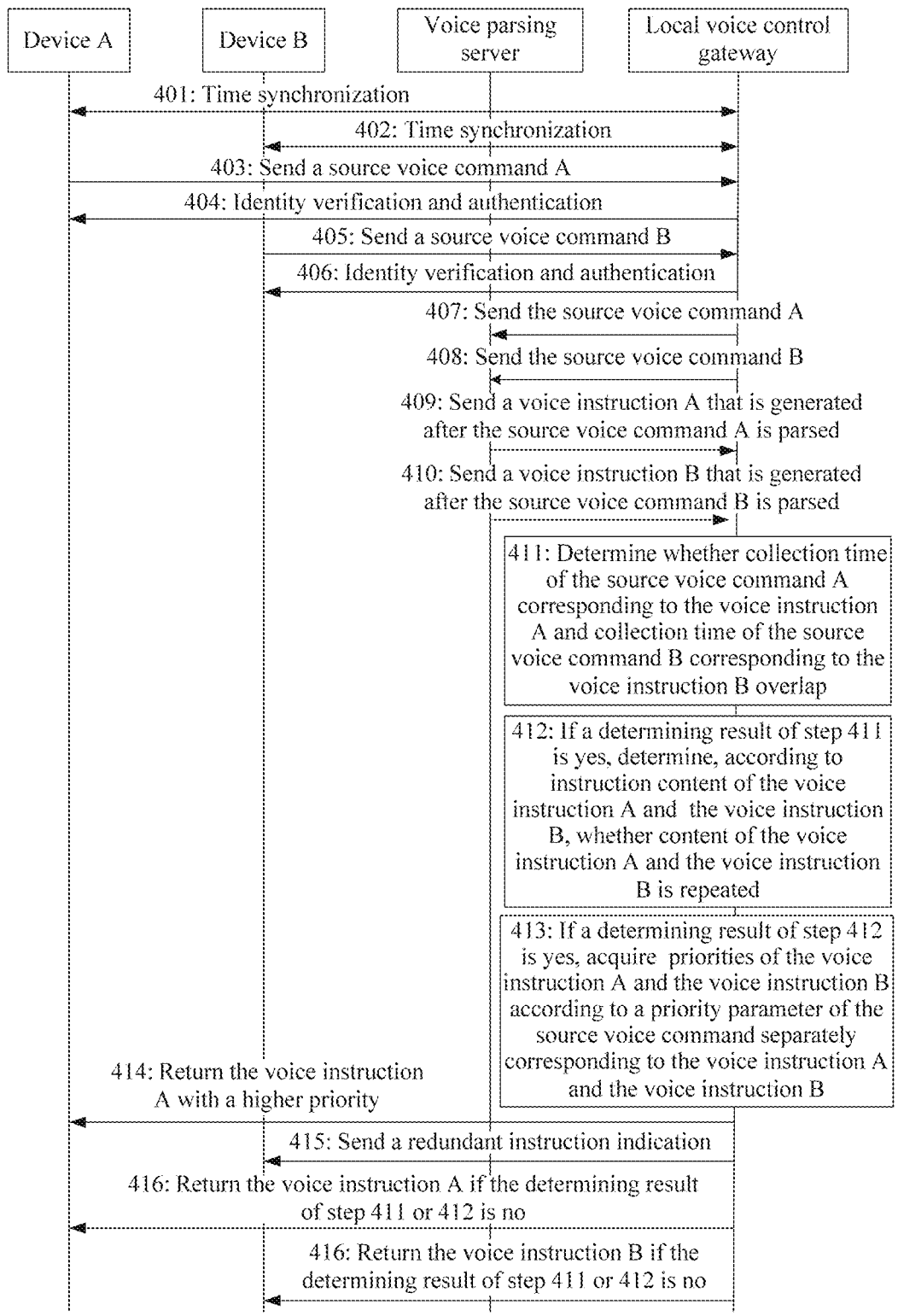
FIG. 4 is a signaling diagram of a command handling method according to Embodiment 3 of the present invention.
Figure 5:
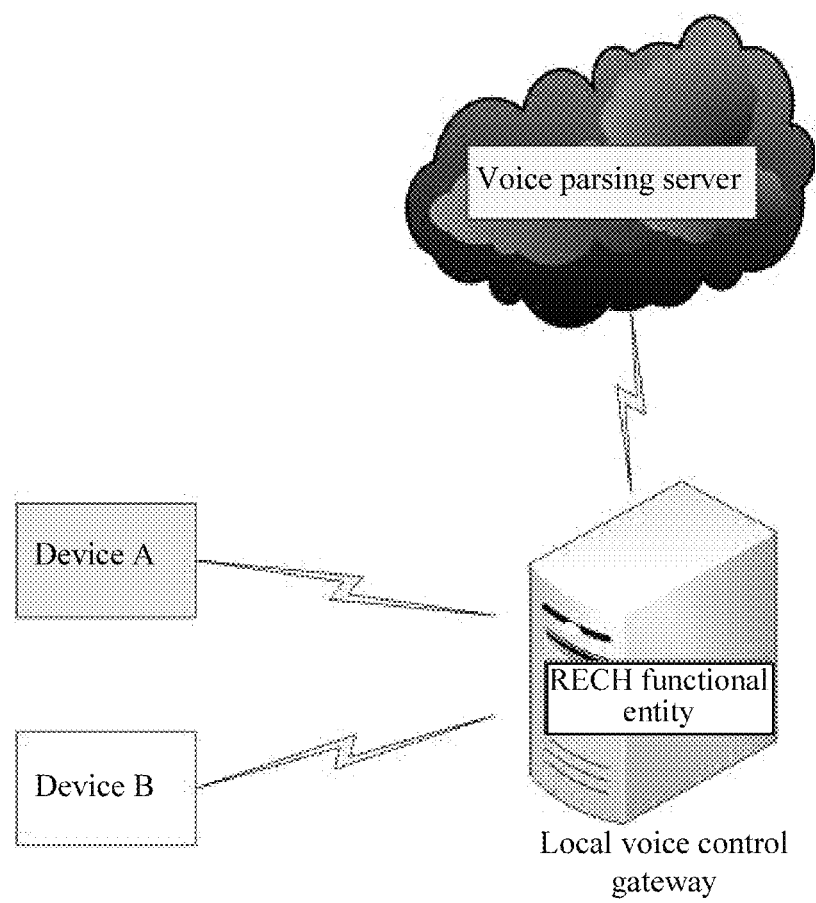
FIG. 5 is a schematic diagram of a system architecture of a command handling method according to Embodiment 3 of the present invention.

FIG. 4 is a signaling diagram of a command handling method according to Embodiment 3 of the present invention. As shown in FIG. 4, this embodiment provides a command handling method. In this embodiment, a RECH functional entity is disposed locally. FIG. 5 is a schematic diagram of a system architecture of a command handling method according to Embodiment 3 of the present invention. As shown in FIG. 5, it is assumed that a device A and a device B are two voice control devices, and both have a voice control function. That the two voice control devices exist in a network is used as an example in this embodiment to describe the solutions of the present invention. The RECH functional entity is a module that is integrated into a local voice control gateway. Certainly, the RECH functional entity may also be a locally disposed device that is independent of the local voice control gateway. Further, the command handling method provided by this embodiment may include the following steps:

Step 401: A device A performs time synchronization with a local voice control gateway.

Step 402: A device B performs time synchronization with the local voice control gateway.

In the foregoing steps, both the device A and the device B that have a voice control function first separately perform time synchronization with the local voice control gateway located locally, so that a subsequent local voice control gateway can accurately acquire collection time information carried in a source voice command.

It should be noted that no time sequence limitation relationship exists between the foregoing step 401 and step 402 in this embodiment, that is, the two steps may be executed at the same time or may be executed in any order.

Step 403: The device A sends a source voice command A to the local voice control gateway.

After the device A listens to and collects a source voice command sent by a user, the source voice command may be "decreasing a volume of the device B by one level". In this step, the device A sends the source voice command A to the local voice control gateway. The source voice command A herein refers to a source voice command reported by the device A. An initial time stamp (initial time stamp A), an end time stamp (end time stamp A), and a priority parameter (priority re-value A) of the source voice command A are carried in the source voice command A. The initial time stamp of the source voice command A is used to indicate initial time of the source voice command listened to by the device A. The end time stamp of the source voice command A is used to indicate end time of the source voice command listened to by the device A. The priority parameter is a parameter that is set by a user and is used to identify a priority of a device or a command when similar instructions occur.

Step 404: The local voice control gateway performs identity verification and authentication on the device A.

After receiving the source voice command reported by the device A, the local voice control gateway first performs identity verification and authentication on the device A, and then executes subsequent parsing after identity verification and authentication are successful.

Step 405: The device B sends a source voice command B to the local voice control gateway.

After the device B listens to and collects a source voice command sent by a user, the source voice command may be "decreasing a volume of the device B by one level". In this step, the device B sends the source voice command B to the local voice control gateway. The source voice command B herein refers to a source voice command reported by the device B. An initial time stamp (initial time stamp B), an end time stamp (end time stamp B), and a priority parameter (priority re-value B) of the source voice command B are carried in the source voice command B. The initial time stamp of the source voice command B is used to indicate initial time of the source voice command listened to by the device B. The end time stamp of the source voice command A is used to indicate end time of the source voice command listened to by the device B. The priority parameter is a parameter that is set by a user and is used to identify a priority of a device or a command when similar instructions occur.

Step 406: The local voice control gateway performs identity verification and authentication on the device B.

After receiving the source voice command reported by the device B, the local voice control gateway first performs identity verification and authentication on the device B, and then executes subsequent parsing after identity verification and authentication are successful.

It should be noted that no time sequence limitation relationship exists between the foregoing step 404 and step 406 in this embodiment, that is, the two steps may be executed at the same time or may be executed in any order.

Step 407: The local voice control gateway sends the source voice command A to a voice parsing server.

Step 408: The local voice control gateway sends the source voice command B to the voice parsing server.

It should be noted that no time sequence limitation relationship exists between the foregoing step 407 and step 408 in this embodiment, that is, the two steps may be executed at the same time or may be executed in any order.

Step 409: The voice parsing server sends a voice instruction A that is generated after the source voice command A is parsed to the local voice control gateway.

After the voice parsing server receives the source voice command A reported by the device A and completes identity verification and authentication on the device A, the voice parsing server parses the source voice command A and generates, by means of parsing, the voice instruction A that can be understood and executed by a device. The voice instruction A corresponds to the source voice command A. The voice parsing server sends the voice instruction A generated after parsing to the local voice control gateway. The initial time stamp, the end time stamp, and the priority parameter of the source voice command A corresponding to the voice instruction A are carried in the voice instruction A. A RECH functional entity in the local voice control gateway performs similarity determining on the voice instruction A and another voice instruction.

Step 410: The voice parsing server sends a voice instruction B that is generated after the source voice command B is parsed to the local voice control gateway.

After the voice parsing server receives the source voice command B reported by the device B and completes identity verification and authentication on the device B, the voice parsing server parses the source voice command B and generates, by means of parsing, the voice instruction B that can be understood and executed by a device. The voice instruction B corresponds to the source voice command B. The voice parsing server sends the voice instruction B generated after parsing to the local voice control gateway. The initial time stamp, the end time stamp, and the priority parameter of the source voice command B corresponding to the voice instruction B are carried in the voice instruction B. The RECH functional entity in the local voice control gateway performs similarity determining on the voice instruction B and another voice instruction.

It should be noted that no time sequence limitation relationship exists between the foregoing step 409 and step 410 in this embodiment, that is, the two steps may be executed at the same time or may be executed in any order.

Step 411: The local voice control gateway determines, according to an initial time stamp and an end time stamp of the source voice command separately corresponding to the voice instruction A and the voice instruction B, whether collection time of the source voice command A corresponding to the voice instruction A and collection time of the source voice command B corresponding to the voice instruction B overlap; if yes, step 412 is executed; and if no, step 416 is executed.

After receiving the voice instruction A and the voice instruction B from the voice parsing server, the local voice control gateway determines, according to collection time information carried in the voice instruction A and the voice instruction B, whether the collection time of the source voice command A corresponding to the voice instruction A and the collection time of the source voice command B corresponding to the voice instruction B overlap, that is, performs time similarity determining, where the collection time information may include an initial time stamp and an end time stamp. Further, during the time similarity determining, the RECH functional entity in the local voice control gateway may determine whether a difference between the initial time stamp of the source voice command A and the initial time stamp of the source voice command B is smaller than a preset threshold, and determine whether a difference between the end time stamp of the source voice command A and the end time stamp of the source voice command B is smaller than a preset threshold. If both of the difference between of the initial time stamps between the two and the difference of the end time stamps between the two are smaller than the preset threshold, it indicates that the collection time of the source voice command A and the source voice command B overlaps; and in this case, step 412 is executed. If the difference of the initial time stamps or end time stamps between the two is greater than or equal to the preset threshold, it indicates that the collection time of the source voice command A and the source voice command B does not overlap; and in this case, step 416 is executed.

Alternatively, during time similarity determining, the RECH functional entity in the local voice control gateway may also separately acquire duration of the voice instruction A and the voice instruction B according to the initial time stamp and the end time stamp of the source voice command separately corresponding to the voice instruction A and the voice instruction B, and determine whether the duration of the voice instruction A and the duration of the voice instruction B overlap. If the duration of the voice instruction A and the voice instruction B overlaps, it indicates that the collection time of the source voice command A and the source voice command B overlaps; and in this case, step 412 is executed. If the duration of the voice instruction A and the voice instruction B does not overlap, it indicates that the voice instruction A and the voice instruction B do not meet a time similarity condition; and in this case, step 416 is executed.

Further, in this embodiment, before the foregoing step 411, the RECH functional entity may also first determine whether a difference between an initial time stamp of the voice instruction A and an initial time stamp of the voice instruction B is greater than a preset time threshold; if yes, step 411 is executed; and if no, the procedure is ended.

Step 412: The RECH functional entity in the local voice control gateway determines, according to instruction content of the voice instruction A and the voice instruction B, whether content of the voice instruction A and the voice instruction B is repeated; if yes, step 413 is executed; and if no, step 416 is executed.

In the foregoing step of determining, when the RECH functional entity in the local voice control gateway determines that the collection time of the source voice command A corresponding to the voice instruction A and the collection time of the source voice command B corresponding to the voice instruction B overlap, the RECH functional entity determines, according to the instruction content of the voice instruction A and the voice instruction B, whether the content of the voice instruction A and the voice instruction B is repeated. Further, voice features of users may be compared to determine whether the source voice commands corresponding to the two voice instructions are sent by a same user. If the instruction content of the voice instruction A and the voice instruction B overlaps to a great extent, for example, a threshold may be set, and if a percentage of overlapping content to the instruction content of the voice instruction A and the voice instruction B is greater than the threshold, it indicates that the content of the voice instruction A and the voice instruction B is repeated; and in this case, the voice instruction A and the voice instruction B are similar instructions, and step 413 is executed. If the instruction content of the voice instruction A and the voice instruction B is different, it indicates that the content of the voice instruction A and the voice instruction B is not repeated; and in this case, the voice instruction A and the voice instruction B are not similar instructions, and step 416 is executed.

It should be noted that it may also be first determined whether the content of the voice instruction A and the voice instruction B is repeated. When the content of the voice instruction A and the voice instruction B is not repeated, step 416 is executed. When the content of the voice instruction A and the voice instruction B is repeated, it is then determined whether the collection time of the source voice command corresponding to the voice instruction A and the collection time of the source voice command corresponding to the voice instruction B overlap. When the collection time does not overlap, step 416 is executed, and when the collection time overlaps, step 413 is executed.

Step 413: The RECH functional entity in the local voice control gateway acquires priorities of the voice instruction A and the voice instruction B according to a priority parameter of the source voice command separately corresponding to the voice instruction A and the voice instruction B.

In a process of the foregoing time similarity determining and content similarity determining, when it is determined that the voice instruction A and the voice instruction B are similar instructions, the RECH functional entity in the local voice control gateway separately acquires the priorities of the voice instruction A and the voice instruction B according to the priority parameter of the source voice command separately corresponding to the voice instruction A and the voice instruction B. For example, when the priority parameter is set to a volume value for receiving a source voice command by a device, a volume value for receiving the source voice command A by the device A is compared with a volume value for receiving the source voice command B by the device B. A device with a greater volume value indicates that the device is closer to a user, and the device may be a user-faced device. Herein, the device with the greater volume value may be used as a device with a higher priority, that is, the device is defined as a main source voice command collecting terminal. A device with a smaller volume value is used as a device with a lower priority. Correspondingly, a priority of a voice instruction corresponding to a device with a higher priority is also higher, and a priority of a voice instruction corresponding to a device with a lower priority is also lower. In this embodiment, it is assumed that the priority of the voice instruction A is higher than the priority of the voice instruction B.

Step 414: The local voice control gateway returns the voice instruction A with a higher priority to the device A and discards the voice instruction B with a lower priority.

In this embodiment, the voice instruction A with the higher priority is considered as being sent by a source voice command collecting terminal, and the voice instruction B with the lower priority is considered as a redundant instruction. After the priorities of the voice instruction A and the voice instruction B are acquired, the local voice control gateway directly returns the voice instruction A with the higher priority to the device A and discards the voice instruction B with the lower priority.

Step 415: The local voice control gateway sends a redundant instruction indication to the device B.

In this embodiment, the local voice control gateway may further send the redundant instruction indication to the device B to notify the device B that the source voice command listened to by the device B is a redundant command that is unnecessary to be executed.

Step 416: The local voice control gateway returns the voice instruction A to the device A and returns the voice instruction B to the device B.

By means of the foregoing determining, if the voice instruction A and the voice instruction B do not meet a time similarity condition or a content similarity condition, it indicates that the voice instruction A and the voice instruction B are not similar instructions. In this case, the local voice control gateway directly returns the voice instruction A to the device A and returns the voice instruction B to the device B. The device A and the device B respectively execute the voice instruction A and the voice instruction B.

In this embodiment, after each of the foregoing steps are executed, if the local voice control gateway receives a new voice instruction from the voice parsing server, the RECH functional entity in the local voice control gateway may further perform similarity determining on the new voice instruction and a voice instruction that has been returned to other voice control devices. For example, after the RECH functional entity returns the voice instruction A to the device A, if the RECH functional entity further receives, from the voice parsing server, a new voice instruction from the device B, the RECH functional entity may further perform similarity determining on the new voice instruction and the voice instruction A that has been returned to the device A. When the new voice instruction and the voice instruction A are similar instructions, the new instruction does not require to be returned to the device B but is directly discarded.

This embodiment provides a command handling method. An RECH functional entity receives a voice instruction A and a voice instruction B sent by a voice parsing server; determines whether the voice instruction A and the voice instruction B are similar instructions according to an initial time stamp and an end time stamp of a source voice command separately corresponding to the voice instruction A and the voice instruction B, and according to instruction content of the voice instruction A and the voice instruction B; and when the voice instruction A and the voice instruction B are the similar instructions, returns a voice instruction with a higher priority to a corresponding voice control device and discards a voice instruction with a lower priority according to a priority parameter of the source voice command separately corresponding to the voice instruction A and the voice instruction B. In this embodiment, a fact that multiple voice control devices repeatedly execute a voice command collected at the same time is avoided, thereby eliminating a control error caused by repeated execution of a command.

A person of ordinary skill in the art may understand that, all or a part of the steps in each of the foregoing method embodiments may be implemented by a program instructing relevant hardware. The aforementioned program may be stored in a computer readable storage medium. When the program runs, the steps of each of the foregoing method embodiments are performed. The aforementioned storage medium includes various media that are capable of storing program code, such as a read-only memory (ROM), a random access memory (RAM), a magnetic disk, or an optical disc.

Figure 6:
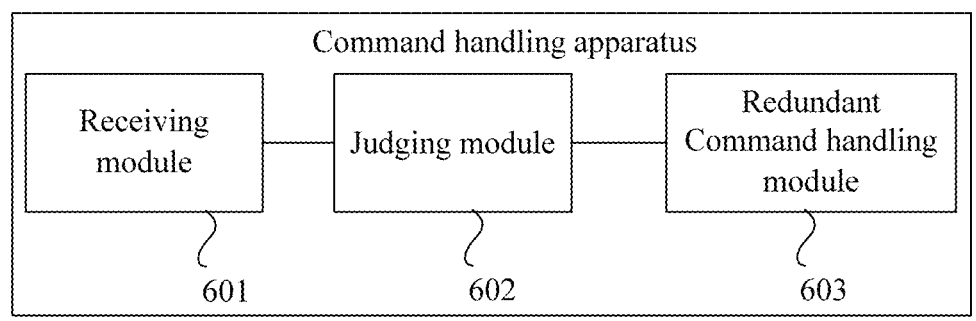
FIG. 6 is a schematic structural diagram of a command handling apparatus according to Embodiment 1 of the present invention.

FIG. 6 is a schematic structural diagram of a command handling apparatus according to Embodiment 1 of the present invention. As shown in FIG. 6, this embodiment provides a command handling apparatus which may execute each step in the foregoing method Embodiment 1, and details are not described herein again. The command handling apparatus provided by this embodiment may include a receiving module 601, a judging module 602, and a redundant command handling module 603. The receiving module 601 is configured to receive multiple voice instructions sent by a voice parsing server, where the multiple voice instructions are generated after the voice parsing server parses source voice commands that are from different voice control devices. The judging module 602 is configured to separately determine whether any two voice instructions in the multiple voice instructions received by the receiving module 601 are similar instructions, where the similar instructions are voice instructions corresponding to source voice commands that are obtained by the different voice control devices by collecting same voice information. The redundant command handling module 603 is configured to discard one voice instruction in the two similar voice instructions when a determining result of the judging module 602 is that two voice instructions that are similar instructions exist in the multiple voice instructions.

Figure 7:
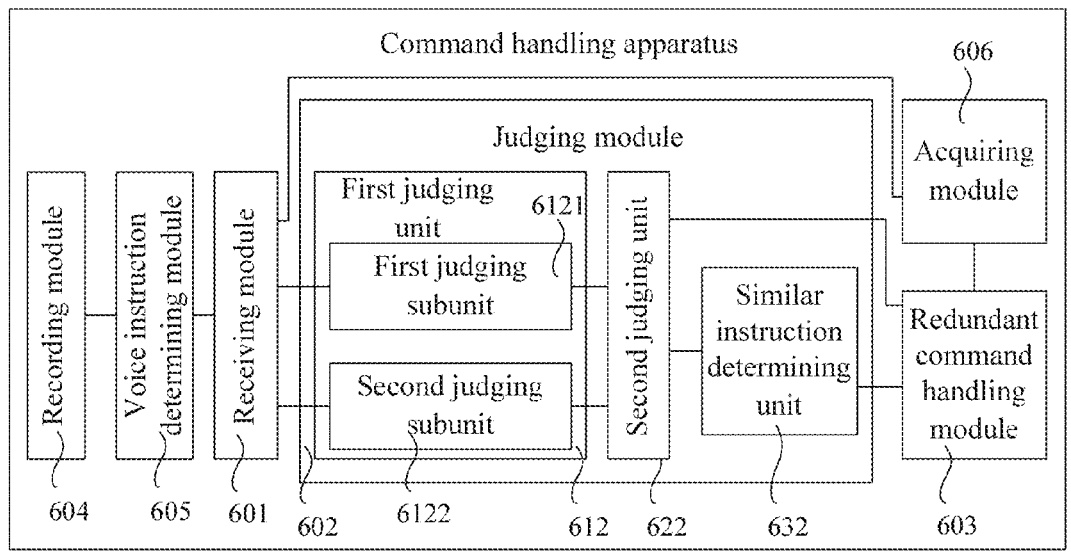
FIG. 7 is a schematic structural diagram of a command handling apparatus according to Embodiment 2 of the present invention.

FIG. 7 is a schematic structural diagram of a command handling apparatus according to Embodiment 2 of the present invention. As shown in FIG. 7, this embodiment provides a command handling apparatus which may execute each step in the foregoing method Embodiment 2 or Embodiment 3, and details are not described herein again. In the command handling apparatus provided by this embodiment on a basis of the command handling apparatus shown in the foregoing FIG. 6, the multiple voice instructions received by the receiving module 601 separately carry collection time information of a source voice command corresponding to each voice instruction and instruction content of each voice instruction. The judging module 602 may include a first judging unit 612, a second judging unit 622, and a similar instruction determining unit 632. The first judging unit 612 is configured to separately determine, according to collection time information of source voice commands corresponding to the multiple voice instructions received by the receiving module 601, whether collection time of source voice commands corresponding to any two voice instructions in the multiple voice instructions overlaps. The second judging unit 622 is configured to separately determine, according to instruction content of the multiple voice instructions received by the receiving module 601, whether content of the any two voice instructions in the multiple voice instructions is repeated. The similar instruction determining unit 632 is configured to determine, when determining results of the first judging unit 612 and the second judging unit 622 are that the collection time of the source voice commands corresponding to the any two voice instructions in the multiple voice instructions overlaps, and that the content of the any two voice instructions in the multiple voice instructions is repeated, that the two voice instructions are similar instructions.

Further, the command handling apparatus provided by this embodiment may further include a recording module 604 and a voice instruction determining module 605. The recording module 604 is configured to record collection time information of the new voice instruction when a new voice instruction is received from the voice parsing server. The voice instruction determining module 605 is configured to compare collection time of the new voice instruction with collection time of a voice instruction previously recorded by the recording module 604; determine a related voice instruction of which a difference between the collection time and the collection time of the new voice instruction is smaller than a predetermined threshold; and use the new voice instruction and the related voice instruction as the multiple voice instructions.

Further, the first judging unit 612 may include a first judging subunit 6121 or a second judging subunit 6122. The first judging subunit 6121 is configured to separately determine, according to initial time stamps and end time stamps of the source voice commands corresponding to the multiple voice instructions received by the receiving module 601, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and if the difference of the initial time stamps and the difference of the end time stamps are both smaller than the preset threshold, determine that the collection time of the source voice commands corresponding to the any two voice instructions in the multiple voice instructions overlaps. The second judging subunit 6122 is configured to separately acquire duration of the multiple voice instructions according to the initial time stamps and the end time stamps of the source voice commands corresponding to the multiple voice instructions received by the receiving module 601; determine whether duration of the any two voice instructions in the multiple voice instructions overlaps; and if the duration overlaps, determine that the collection time of the source voice commands corresponding to the any two voice instructions in the multiple voice instructions overlaps.

Further, the multiple voice instructions received by the receiving module 601 in this embodiment further carry priority parameters of the source voice commands corresponding to the multiple voice instructions. The command handling apparatus may further include an acquiring module 606. The acquiring module 606 is configured to determine a voice instruction with a higher priority in two similar voice instructions and a voice instruction with a lower priority in the two similar voice instructions according to the priority parameters of the source voice commands corresponding to the voice instructions received by the receiving module 601. The redundant command handling module 603 is configured to, when the determining result of the judging module 602 is that two voice instructions that are similar instructions exist in the multiple voice instructions, return the voice instruction with the higher priority in the two similar voice instructions to a corresponding voice control device, and discard the voice instruction with the lower priority.

Further, the redundant command handling module 603 in the command handling apparatus is further configured to discard the new voice instruction when a new voice instruction received by the receiving module 601 and a voice instruction that has been returned to other voice control devices are similar instructions.

This embodiment provides a command handling apparatus. By receiving multiple voice instructions sent by a voice parsing server, it is separately determined whether any two voice instructions in the multiple voice instructions are similar instructions, where the similar instructions are voice instructions corresponding to source voice commands that are obtained by different voice control devices by collecting same voice information; when two voice instructions are similar instructions, one voice instruction in the two similar voice instructions is discarded. In this embodiment, a fact that multiple voice control devices repeatedly execute a voice command collected at the same time, thereby eliminating a control error caused by repeated execution of a command.

Figure 8:
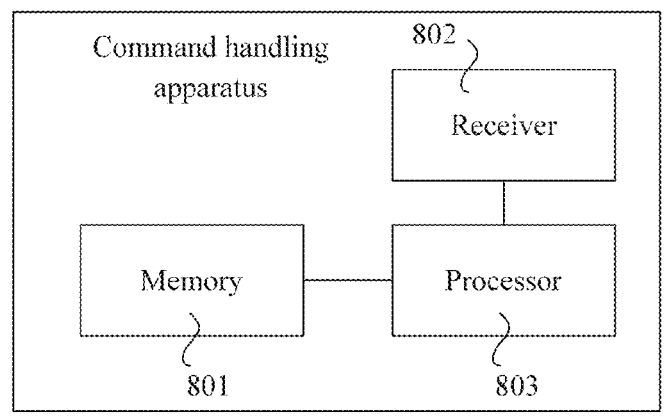
FIG. 8 is a schematic structural diagram of a command handling apparatus according to Embodiment 3 of the present invention.

FIG. 8 is a schematic structural diagram of a command handling apparatus according to Embodiment 3 of the present invention. As shown in FIG. 8, the command handling apparatus provided by this embodiment may include a memory 801, a receiver 802, and a processor 803. The receiver 802 is configured to receive multiple voice instructions sent by a voice parsing server, where the multiple voice instructions are generated after the voice parsing server parses source voice commands that are from different voice control devices. The memory 801 is configured to store a program instruction. The processor 803 is coupled with the memory 801 and the receiver 802. The processor 803 is configured to separately determine, according to the program instruction in the memory 801, whether any two voice instructions in the multiple voice instructions received by the receiver 802 are similar instructions, where the similar instructions are voice instructions corresponding to source voice commands that are obtained by the different voice control devices by collecting same voice information; and when two voice instructions that are similar instructions exist in the multiple voice instructions, discard one voice instruction in the two similar voice instructions.

Further, the multiple voice instructions received by the receiver 802 separately carry collection time information of a source voice command corresponding to each voice instruction and instruction content of each voice instruction. The processor 803 is configured to separately determine, according to collection time information of source voice commands corresponding to the multiple voice instructions, whether collection time of source voice commands corresponding to the any two voice instructions in the multiple voice instructions overlaps; separately determine, according to instruction content of the multiple voice instructions, whether content of the any two voice instructions in the multiple voice instructions is repeated; and determine that the two voice instructions are similar instructions when the collection time of the source voice commands corresponding to the any two voice instructions in the multiple voice instructions overlaps, and the content of the any two voice instructions in the multiple voice instructions is repeated.

Further, the processor 803 is configured to, when a new voice instruction is received from the voice parsing server, record collection time information of the new voice instruction, compare collection time of the new voice instruction with collection time of a previously recorded voice instruction, and determine a related voice instruction of which a difference between the collection time and the collection time of the new voice instruction is smaller than a predetermined threshold; and use the new voice instruction and the related voice instruction as the multiple voice instructions.

The processor 803 is configured to separately determine, according to initial time stamps and end time stamps of the source voice commands corresponding to the multiple voice instructions, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and if the difference of the initial time stamps and the difference of the end time stamps are both smaller than the preset threshold, determine that the collection time of the source voice commands corresponding to the any two voice instructions in the multiple voice instructions overlaps. Alternatively, the processor 803 is configured to separately acquire duration of the multiple voice instructions according to initial time stamps and end time stamps of the source voice commands corresponding to the multiple voice instructions; determine whether duration of the any two voice instructions in the multiple voice instructions overlaps, and if the duration overlaps, determine that the collection time of the source voice commands corresponding to the any two voice instructions in the multiple voice instructions overlaps.

Further, the multiple voice instructions received by the receiver 802 separately carry a priority parameter of the source voice command corresponding to each voice instruction. The processor 803 is further configured to determine a voice instruction with a higher priority in the two similar voice instructions and a voice instruction with a lower priority in the two similar voice instructions according to the priority parameter of the source voice command corresponding to the voice instruction; and when two voice instructions that are similar instructions exist in the multiple voice instructions, return the voice instruction with the higher priority in the two similar voice instructions to a corresponding voice control device, and discard the voice instruction with the lower priority.

Further, the processor 803 is configured to discard the new voice instruction when a received new voice instruction and a voice instruction that has been returned to other voice control devices are similar instructions.

Figure 9:
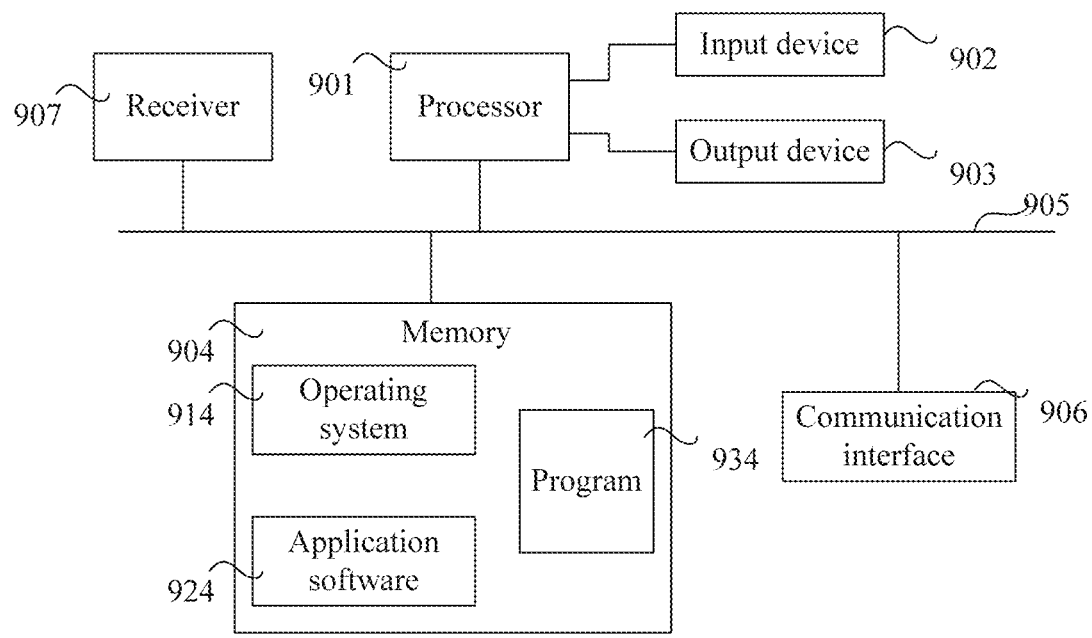
FIG. 9 is a schematic structural diagram of a computer system according to an embodiment of the present invention.

FIG. 9 is a schematic structural diagram of a computer system according to an embodiment of the present invention. As shown in FIG. 9, this embodiment provides a computer system. The computer system may be a microprocessor computer, such as, a general-purpose personal computer (PC), a customized PC, and a portable device including a desktop computer, a smart phone, or the like; however, the scope of the present invention is not limited to these examples. The computer system includes a processor 901, an input device 902, and an output device 903. The input device 902 and the output device 903 are coupled to the processor 901.

The processor 901 may be a general-purpose central processing unit (CPU), an application specific integrated circuit (ASIC), or one or more integrated circuits. The processor 901 is configured to control a program that executes the present invention. The input device 902 includes a keyboard, a mouse, a keypad, a touchscreen input device, a voice input module, and the like. The output device 903 includes a screen display unit and a voice module.

The computer system further includes a memory 904. The memory 904 may also include one or more of the following storage devices: a ROM, a RAM, and a hard disk. The memory 904 is coupled with the processor 901 using a signal bus 905.

The computer system further includes a communication interface 906 that is configured for communication with a communications network, such as an Ethernet, a radio access network (RAN), and a wireless local area network (WLAN).

The foregoing memory 904 (such as the RAM) stores an operating system 914, application software 924, a program 934, and the like. The operating system 914 is an application program that controls a processing process executed by the processor. The application software 924 may be a word processor, an email program, and the like, and is configured to display data on the output device 903 to a user. The program 934 may be a program corresponding to a command handling method provided by the present invention.

The computer system further includes a receiver 907 which is configured to receive multiple voice instructions sent by a voice parsing server, where the multiple voice instructions are generated after the voice parsing server parses source voice commands that are from different voice control devices. The processor 901 in this embodiment is configured to execute an instruction stored in the memory 904. The processor 901 is configured to separately determine whether any two voice instructions in the multiple voice instructions are similar instructions, where the similar instructions are voice instructions corresponding to source voice commands that are obtained by the different voice control devices by collecting same voice information; and when two voice instructions that are similar instructions exist in the multiple voice instructions, discard one voice instruction in the two similar voice instructions.

The multiple voice instructions received by the receiver 907 separately carry collection time information of a source voice command corresponding to each voice instruction and instruction content of each voice instruction. The processor 901 is configured to separately determine, according to collection time information of source voice commands corresponding to the multiple voice instructions, whether collection time of source voice commands corresponding to the any two voice instructions in the multiple voice instructions overlaps; separately determine, according to instruction content of the multiple voice instructions, whether content of the any two voice instructions in the multiple voice instructions is repeated; and determine that the two voice instructions are similar instructions when the collection time of the source voice commands corresponding to the any two voice instructions in the multiple voice instructions overlaps, and the content of the any two voice instructions in the multiple voice instructions is repeated.

Further, the processor 901 is configured to, when a new voice instruction is received from the voice parsing server, record collection time information of the new voice instruction; compare collection time of the new voice instruction with collection time of a previously recorded voice instruction, and determine a related voice instruction of which a difference between the collection time and the collection time of the new voice instruction is smaller than a predetermined threshold; and use the new voice instruction and the related voice instruction as the multiple voice instructions.

The processor 901 is configured to separately determine, according to initial time stamps and end time stamps of the source voice commands corresponding to the multiple voice instructions, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and if the difference of the initial time stamps and the difference of the end time stamps are both smaller than the preset threshold, determine that the collection time of the source voice commands corresponding to the any two voice instructions in the multiple voice instructions overlaps. Alternatively, the processor 901 is configured to separately acquire duration of the multiple voice instructions according to initial time stamps and end time stamps of the source voice commands corresponding to the multiple voice instructions; determine whether duration of the any two voice instructions in the multiple voice instructions overlaps; and if the duration overlaps, determine that the collection time of the source voice commands corresponding to the any two voice instructions in the multiple voice instructions overlaps.

Further, the multiple voice instructions received by the receiver 907 separately carry a priority parameter of the source voice command corresponding to each voice instruction. The processor 901 is further configured to determine a voice instruction with a higher priority in the two similar voice instructions and a voice instruction with a lower priority in the two similar voice instructions, according to the priority parameter of the source voice command corresponding to the voice instruction; and when the two voice instructions that are similar instructions exist in the multiple voice instructions, return the voice instruction with the higher priority in the two similar voice instructions to a corresponding voice control device, and discard the voice instruction with the lower priority.

Further, the processor 901 is configured to, when a received new voice instruction and a voice instruction that has been returned to other voice control devices are similar instructions, discard the new voice instruction.

Figure 10:
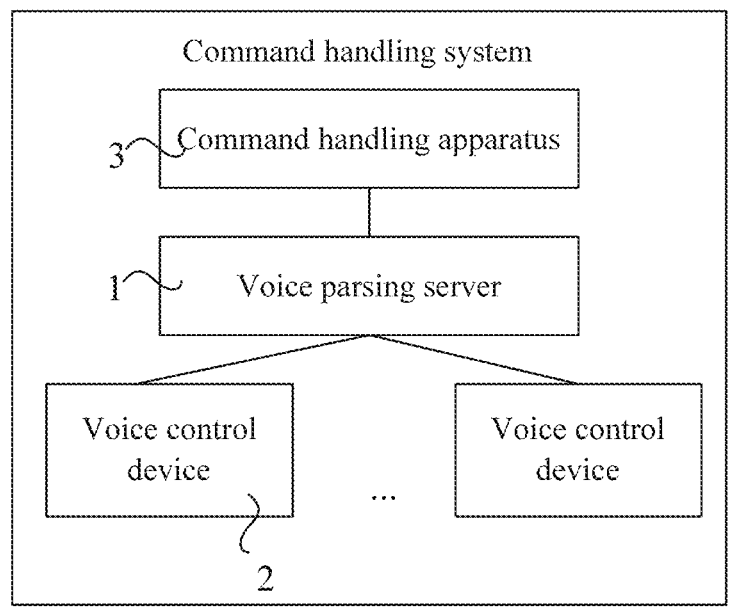
FIG. 10 is a schematic structural diagram of a command handling system according to Embodiment 1 of the present invention.

FIG. 10 is a schematic structural diagram of a command handling system according to Embodiment 1 of the present invention. As shown in FIG. 10, the command handling system provided by this embodiment may include a voice parsing server 1, multiple voice control devices 2, and a command handling apparatus 3. The command handling apparatus 3 may be the command handling apparatus shown in the foregoing FIG. 6, FIG. 7, or FIG. 8. The command handling apparatus 3 in this figure is a device independent of the voice parsing server 1. The command handling apparatus 3 may also be disposed in the voice parsing server 1 according to an actual situation (which is not shown in FIG. 10). The multiple voice control devices 2 are configured to separately collect multiple source voice commands, and separately send the multiple source voice commands to the voice parsing server 1. The voice parsing server 1 is configured to receive the multiple source voice commands sent by the multiple voice control devices 2, generate multiple voice instructions corresponding to the multiple source voice commands after parsing the multiple source voice commands, and send the multiple voice instructions to the command handling apparatus 3.

The voice parsing server 1 in this embodiment is further configured to perform time synchronization with the multiple voice control devices 2.

Figure 11:
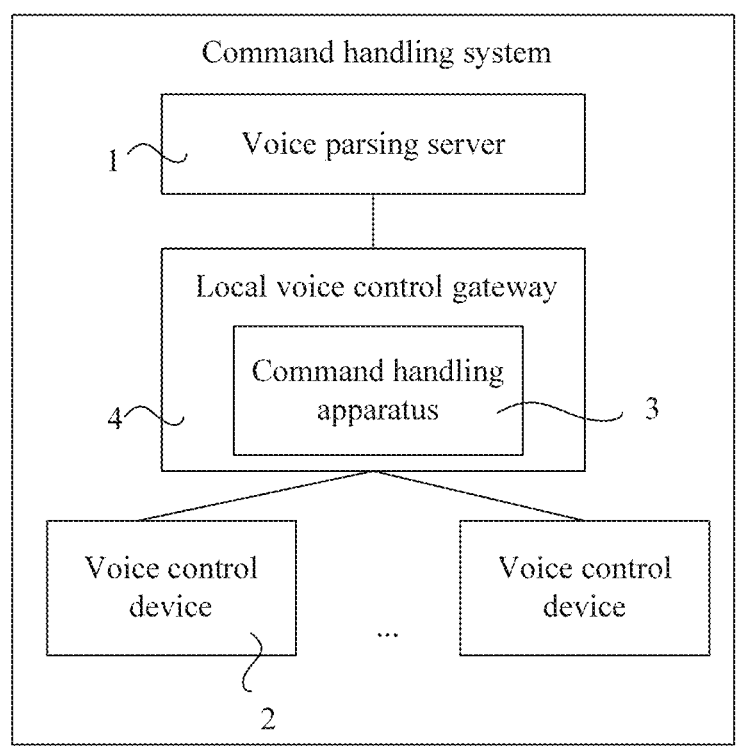
FIG. 11 is a schematic structural diagram of a command handling system according to Embodiment 2 of the present invention.

FIG. 11 is a schematic structural diagram of a command handling system according to Embodiment 2 of the present invention. As shown in FIG. 11, the command handling system provided by this embodiment may include a voice parsing server 1, multiple voice control devices 2, and a local voice control gateway 4. The local voice control gateway 4 may include the command handling apparatus shown in the foregoing FIG. 6, FIG. 7, or FIG. 8. The multiple voice control devices 2 are configured to separately collect multiple source voice commands, and separately send the multiple source voice commands to the local voice control gateway 4. The voice parsing server 1 is configured to separately receive multiple source voice commands sent by the local voice control gateway 4, generate multiple voice instructions corresponding to the multiple source voice commands after parsing the multiple source voice commands, and separately return the multiple voice instructions to the local voice control gateway 4.

The local voice control gateway 4 in this embodiment is further configured to perform time synchronization with the multiple voice control devices 2.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A command handling method comprising:
   receiving multiple voice instructions sent by a voice parsing server, wherein the multiple voice instructions are generated after the voice parsing server parses source voice commands from different voice control devices, and wherein the multiple voice instructions separately carry collection time information of a source voice command corresponding to each voice instruction and instruction content of each voice instruction;
   separately determining, according to the collection time information of the source voice commands corresponding to the multiple voice instructions, whether the collection time information of the source voice commands corresponding to any two voice instructions in the multiple voice instructions overlaps;
   separately determining, according to the instruction content of the multiple voice instructions, whether content of the any two voice instructions in the multiple voice instructions is repeated;
   determining that the any two voice instructions are similar instructions when the collection time information of the source voice commands corresponding to the any two voice instructions in the multiple voice instructions overlaps and the content of the any two voice instructions in the multiple voice instructions is repeated, wherein the similar instructions are voice instructions corresponding to the source voice commands obtained by the different voice control devices by collecting same voice information;
   discarding one voice instruction in the any two voice instructions when the any two voice instructions that are similar instructions exist in the multiple voice instructions; and
   executing an operation indicated by a remaining voice instruction from the any two voice instructions.

2. The method according to claim 1, further comprising:
   recording, when a new voice instruction is received from the voice parsing server, collection time information of the new voice instruction;
   comparing the collection time information of the new voice instruction with a collection time information of a previously recorded voice instruction;
   determining a related voice instruction of which a difference between the collection time information of the previously recorded voice instruction and the collection time information of the new voice instruction is smaller than a predetermined threshold; and
   using the new voice instruction and the related voice instruction as the multiple voice instructions.

3. The method according to claim 1, wherein separately determining, according to the collection time information of the source voice commands corresponding to the multiple voice instructions, whether the collection time information of the source voice commands corresponding to the any two voice instructions in the multiple voice instructions overlaps comprises:
   separately determining, according to initial time stamps and end time stamps of the source voice commands corresponding to the multiple voice instructions, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and
   determining that the collection time information of the source voice commands corresponding to the any two voice instructions in the multiple voice instructions overlaps when the difference of the initial time stamps and the difference of the end time stamps are both smaller than the preset threshold.

4. The method according to claim 1, wherein separately determining, according to the collection time information of the source voice commands corresponding to the multiple voice instructions, whether the collection time information of the source voice commands corresponding to the any two voice instructions in the multiple voice instructions overlaps comprises:
   separately acquiring a duration of the multiple voice instructions according to initial time stamps and end time stamps of the source voice commands corresponding to the multiple voice instructions;
   determining whether the duration of the any two voice instructions in the multiple voice instructions overlaps; and
   determining that the collection time of the source voice commands corresponding to the any two voice instructions in the multiple voice instructions overlaps when the duration overlaps.

5. The method according to claim 1, wherein the multiple voice instructions further separately carry a priority parameter of the source voice command corresponding to each voice instruction, wherein the method further comprises determining a voice instruction with a higher priority in the any two similar voice instructions and a voice instruction with a lower priority in the any two similar voice instructions according to the priority parameter of the source voice command corresponding to the voice instruction, and wherein discarding one voice instruction in the any two voice instructions when the any two voice instructions that are similar instructions exist in the multiple voice instructions comprises:
   returning the voice instruction with the higher priority in the two similar voice instructions to a corresponding voice control device when the any two voice instructions that are the similar instructions exist in the multiple voice instructions; and
   discarding the voice instruction with the lower priority.

6. The method according to claim 5, further comprising discarding the new voice instruction when a received new voice instruction and a voice instruction that has been returned to other voice control devices are similar instructions.

7. The method according to claim 1, further comprising:
performing, by the voice parsing server, time synchronization with the voice control devices; and
separately receiving, by the voice parsing server, the source voice commands sent by the voice control devices.

8. The method according to claim 1, further comprising:
performing, by a local voice control gateway, time synchronization with the voice control devices;
separately receiving, by the local voice control gateway, the source voice commands sent by the voice control devices; and
sending, by the local voice control gateway, the source voice commands to the voice parsing server.

9. A command handling apparatus comprising:
a memory configured to store a program instruction;
a receiver configured to receive multiple voice instructions sent by a voice parsing server, wherein the multiple voice instructions are generated after the voice parsing server parses source voice commands that are from different voice control devices, and wherein the multiple voice instructions received by the receiver separately carry collection time information of a source voice command corresponding to each voice instruction and instruction content of each voice instruction; and
a processor coupled to the memory and the receiver and configured to:
separately determine, according to the collection time information of the source voice commands corresponding to the multiple voice instructions, whether the collection time information of the source voice commands corresponding to the any two voice instructions in the multiple voice instructions overlaps;
separately determine, according to the instruction content of the multiple voice instructions, whether content of the any two voice instructions in the multiple voice instructions is repeated;
determine that the any two voice instructions are similar instructions when the collection time information of the source voice commands corresponding to the any two voice instructions in the multiple voice instructions overlaps and the content of the any two voice instructions in the multiple voice instructions is repeated, wherein the similar instructions are voice instructions corresponding to the source voice commands that are obtained by the different voice control devices by collecting same voice information;
discard one voice instruction in the any two voice instructions when the any two voice instructions that are similar instructions exist in the multiple voice instructions; and
execute an operation indicated by a remaining voice instruction from the any two voice instructions.

10. The apparatus according to claim 9, wherein the processor is further configured to:
record collection time information of the new voice instruction when a new voice instruction is received from the voice parsing server;
compare the collection time information of the new voice instruction with a collection time information of a previously recorded voice instruction;
determine a related voice instruction of which a difference between the collection time information of the previously recorded voice instruction and the collection time information of the new voice instruction is smaller than a predetermined threshold; and
use the new voice instruction and the related voice instruction as the multiple voice instructions.

11. The apparatus according to claim 9, wherein the processor is configured to:
separately determine, according to initial time stamps and end time stamps of the source voice commands corresponding to the multiple voice instructions, whether a difference of initial time stamps of the source voice commands corresponding to the any two voice instructions in the multiple voice instructions and a difference of end time stamps of the source voice commands corresponding to the any two voice instructions in the multiple voice instructions are both smaller than a preset threshold; and
determine that the collection time information of the source voice commands corresponding to the any two voice instructions in the multiple voice instructions overlaps when the difference of the initial time stamps and the difference of the end time stamps are both smaller than the preset threshold.

12. The apparatus according to claim 9, Wherein the processor is configured to:
separately acquire a duration of the multiple voice instructions according to initial time stamps and end time stamps of the source voice commands corresponding to the multiple voice instructions;
determine whether the duration of the any two voice instructions in the multiple voice instructions overlaps; and
determine that the collection time of the source voice commands corresponding to the any two voice instructions in the multiple voice instructions overlaps when the duration overlaps.

13. The apparatus according to claim 9, wherein the multiple voice instructions received by the receiver further separately carry a priority parameter of the source voice command corresponding to each voice instruction, and wherein the processor is further configured to:
determine a voice instruction with a higher priority in the two similar voice instructions and a voice instruction with a lower priority in the any two voice instructions according to the priority parameter of the source voice command corresponding to the voice instruction;
return the voice instruction with the higher priority in the two similar voice instructions to a corresponding voice control device when the any two voice instructions that are similar instructions exist in the multiple voice instructions; and
discard the voice instruction with the lower priority.

14. The apparatus according to claim 9, wherein the processor is further configured to discard the new voice instruction when a received new voice instruction and a voice instruction that has been returned to other voice control devices are similar instructions.

15. A command handling system comprising:
a voice parsing server;
multiple voice control devices; and
a command handling apparatus comprising:
a receiver configured to receive multiple voice instructions sent by the voice parsing server, where the multiple voice instructions are generated after the voice parsing server parses source voice commands that are from different voice control devices, and wherein the multiple voice instructions received by the receiver separately carry collection time information of a source voice command corresponding to each voice instruction and instruction content of each voice instruction,
a memory configured to store a program instruction;
a processor coupled to the memory and the receiver and configured to:
separately determine, according to the collection time information of the source voice commands corresponding to the multiple voice instructions, whether the collection time information of the source voice commands corresponding to the any two voice instructions in the multiple voice instructions overlaps;
separately determine, according to the instruction content of the multiple voice instructions, whether content of the any two voice instructions in the multiple voice instructions is repeated;
determine that the any two voice instructions are similar instructions when the collection time information of the source voice commands corresponding to the any two voice instructions in the multiple voice instructions overlaps and the content of the any two voice instructions in the multiple voice instructions is repeated, wherein the similar instructions are voice instructions corresponding to source voice commands that are obtained by the different voice control devices by collecting same voice information;
discard one voice instruction in the any two voice instructions when the any two voice instructions that are similar instructions exist in the multiple voice instructions; and
execute an operation indicated by a remaining voice instruction from the any two voice instructions,
wherein the multiple voice control devices are configured to:
separately collect multiple source voice commands; and
separately send the multiple source voice commands to the voice parsing server, and
wherein the voice parsing server is configured to:
receive the multiple source voice commands sent by the multiple voice control devices;
generate multiple voice instructions corresponding to the multiple source voice commands after parsing the multiple source voice commands; and
separately send the multiple voice instructions to the command handling apparatus.

16. The system according to claim 15, wherein the multiple voice instructions received by the receiver further separately carry a priority parameter of the source voice command corresponding to each voice instruction, and wherein the processor is further configured to:
determine a voice instruction with a higher priority in the any two similar voice instructions and a voice instruction with a lower priority in the any two similar voice instructions according to the priority parameter of the source voice command corresponding to the voice instruction;
return the voice instruction with the higher priority in the any two similar voice instructions to a corresponding voice control device when the any two voice instructions that are similar instructions exist in the multiple voice instructions; and
discard the voice instruction with the lower priority.

17. The system according to claim 15, wherein the voice parsing server is further configured to perform time synchronization with the multiple voice control devices.

18. A command handling system comprising:
a voice parsing server;
multiple voice control devices; and
a local voice control gateway comprising a command handling apparatus, wherein the command handling apparatus comprises:
a memory configured to store a program instruction;
a receiver configured to receive multiple voice instructions sent by a voice parsing server, where the multiple voice instructions are generated after the voice parsing server parses source voice commands that are from different voice control devices, and wherein the multiple voice instructions received by the receiver separately carry collection time information of a source voice command corresponding to each voice instruction and instruction content of each voice instruction; and
a processor coupled to the memory and the receiver and configured to:
separately determine, according to the collection time information of the source voice commands corresponding to the multiple voice instructions, whether the collection time information of the source voice commands corresponding to the any two voice instructions in the multiple voice instructions overlaps;
separately determine, according to the instruction content of the multiple voice instructions, whether content of the any two voice instructions in the multiple voice instructions is repeated;
determine that the any two voice instructions are similar instructions when the collection time information of the source voice commands corresponding to the any two voice instructions in the multiple voice instructions overlaps and the content of the any two voice instructions in the multiple voice instructions is repeated, wherein the similar instructions are voice instructions corresponding to the source voice commands that are obtained by the different voice control devices by collecting same voice information;
discard one voice instruction in the any two similar voice instructions when the any two voice instructions that are similar instructions exist in the multiple voice instructions; and
execute an operation indicated by a remaining voice instruction from the any two voice instructions,
wherein the multiple voice control devices are configured to:
separately collect multiple source voice commands; and
separately send the multiple source voice commands to the local voice control gateway, and
wherein the voice parsing server is configured to:
separately receive the multiple source voice commands sent by the local voice control gateway;
generate multiple voice instructions corresponding to the multiple source voice commands after parsing the multiple source voice commands; and
separately return the multiple voice instructions to the local voice control gateway.

19. The system according to claim 18, wherein the multiple voice instructions received by the receiver further separately carry a priority parameter of the source voice command corresponding to each voice instruction, and wherein the processor is further configured to:
- determine a voice instruction with a higher priority in the any two similar voice instructions and a voice instruction with a lower priority in the any two similar voice instructions according to the priority parameter of the source voice command corresponding to the voice instruction; and
- return the voice instruction with the higher priority in the any two similar voice instructions to a corresponding voice control device; and
- discard the voice instruction with the lower priority when the any two voice instructions that are similar instructions exist in the multiple voice instructions.

20. The system according to claim 18, wherein the local voice control gateway is further configured to perform time synchronization with the multiple voice control devices.

* * * * *